United States Patent
Kesten et al.

(10) Patent No.: US 6,539,731 B2
(45) Date of Patent: Apr. 1, 2003

(54) DEHUMIDIFICATION PROCESS AND APPARATUS

(76) Inventors: Arthus S. Kesten, 17 Morningcrest Rd., West Hartford, CT (US) 06117; Sunita Satyapal, 15D Thistle Way, East Windsor, CT (US) 06088; James D. Freihaut, 8 Woodcock La., South Windsor, CT (US) 06074; Carol M. Hawk, 345 Buckland Hills, Drive, Manchester, CT (US) 06040

( * ) Notice: Subject to any disclaimer, the term of this patent is extended or adjusted under 35 U.S.C. 154(b) by 0 days.

(21) Appl. No.: 09/822,559

(22) Filed: Mar. 30, 2001

(65) Prior Publication Data

US 2002/0139127 A1 Oct. 3, 2002

(51) Int. Cl.$^7$ .............................. F25D 17/06
(52) U.S. Cl. .................. 62/93; 62/90; 62/94; 62/271; 62/335; 62/513; 62/407; 62/404
(58) Field of Search ............... 62/93, 90, 94, 62/271, 335, 513, 404, 407

(56) References Cited

U.S. PATENT DOCUMENTS

| | | | |
|---|---|---|---|
| 4,429,735 A | * | 2/1984 | Nomaguchi et al. .......... 165/60 |
| 5,512,083 A | * | 4/1996 | Dunne .......................... 95/113 |
| 5,548,905 A | * | 8/1996 | Kuma et al. .................... 34/92 |
| 5,667,560 A | * | 9/1997 | Dunne .......................... 95/113 |
| 5,753,345 A | * | 5/1998 | Kuma et al. ................. 428/143 |
| 5,826,443 A | * | 10/1998 | Ares et al. .................. 62/324.1 |
| 6,055,824 A | * | 5/2000 | Kuma et al. ................... 62/314 |
| 6,143,390 A | * | 11/2000 | Takamiya et al. ............. 428/90 |

* cited by examiner

*Primary Examiner*—William Doerrler
*Assistant Examiner*—Mark S. Shulman
(74) *Attorney, Agent, or Firm*—Wall Marjama & Bilinski LLP

(57) ABSTRACT

A humid gas stream is dehumidified by bringing that stream into contact with the front surface of a hydrophilic capillary condenser layer that captures the water and moves it adjacent the rear surface of the capillary layer. An osmotic layer, such as a semi-permeable membrane, is disposed on the rear surface of the condenser layer, and an osmotic fluid having a low concentration of water therein, is disposed adjacent the osmotic layer. An osmotic driving force, resulting from the water concentration gradient across the osmotic layer, transports the condensed water from the condensing layer through the thickness of the osmotic layer and into an osmotic fluid. The osmotic layer also inhibits the osmotic fluid from flowing into the condenser layer.

27 Claims, 2 Drawing Sheets

DEHUMIDIFICATION PROCESS AND APPARATUS

TECHNICAL FIELD

This invention relates to conditioning a gas stream, such as air, and especially to the dehumidification of a gas stream.

BACKGROUND ART

Conditioning of a gas stream, such as air, generally involves the removal or addition of moisture and the increase or decrease of temperature to make the gas stream suitable for its intended environment. For air conditioning in warm weather, this typically involves dehumidifying and cooling the air to comfortable levels.

Current dehumidification technology is based on the conventional, refrigerant vapor compression cycle (hereinafter referred to as DX technology) or on desiccant substrate capture technology (hereinafter referred to as DS technology). DX technology requires cooling humid supply air, such as the air within a room and/or outside air, to the water vapor condensation point, with external heat rejection on the compression side. This usually requires the supply air to be cooled below comfortable temperatures and, thereafter, either reheated or mixed with warmer air to raise its temperature to an acceptable level before directing it into the space being dehumidified. 20–35% of the energy expended in cooling the high humidity air is utilized to remove the latent heat from the air (the heat of condensation associated with water vapor condensation). Cooling and dehumidification of the air are thus coupled. That makes it impossible to independently control comfort parameters, making the DX cycle less efficient, from an overall system perspective, than a technology that would allow independent control of sensible and latent heat.

In applications where the outside air has both high humidity and temperature and the functional use of the interior space generates high water vapor levels (e.g. populated convention halls, exercise rooms, school buildings, etc.), it may not be possible for the DX technology to maintain the air introduced into the interior space at the correct humidity and temperature for maintaining comfort. The air delivered is cool but "muggy", since further cooling to remove additional water would result in the air being uncomfortably cool.

In stand-alone dehumidification using a conventional compression cycle, heat reject is in direct contact with the room air. As a consequence, the room air becomes more comfortable from a humidity side, but may be less comfortable (too warm) from a temperature parameter consideration. Again the comfort parameters are coupled.

DS systems are generally applied in central air, ducted systems. Water vapor is captured by capillary condensation on a solid phase substrate containing pores of the appropriate size (typically less than 100 Angstroms) to cause capillary condensation. The capture process is efficient and rapid. However, removal of the water vapor from the pores, wherein the intrinsic vapor pressure of the water is lowered in correspondence with the Kelvin equation, requires energy input. It also requires removing the substrate from the high humidity air stream and placing it in an exhaust, water reject stream, before adding the re-evaporation energy. Alternatively, the substrate may remain fixed and the treated air and exhaust streams flow directions interchanged as is done in a parallel bed, desiccant drier system.

In these DS systems, the re-evaporation energy is the latent heat of condensation plus the heat of adsorption of the water vapor in the substrate pore material. It is important to note that DS technology requires, in steady state operation, the addition of this energy at a rate equal to or greater than the latent heat of condensation of water in the desiccant substrate. That is, the water vapor reject power input must exceed the equivalent latent heat of condensation power. After water removal from the desiccant substrate the substrate must be re-cooled to the water capture temperature range of the substrate. As a consequence, some of the sensible heat of the subsequent cooling system (e.g. a DX cooling system) must be utilized in treating the DS substrate rather than for cooling the now dehumidified air.

The advantage of DS technology is that humidity levels in the outside air and/or recirculated air can be adjusted independently of the subsequent cooling step. The disadvantage is the requirement to move the substrate and treated air stream relative to each other for capture and rejection of the water vapor. This requires moving a large substrate through a sealed system, or, in a parallel bed DS system, requires complicated valving and valve cycling to move the humid air stream and an exhaust stream alternately across the desiccant beds. Again, application in typical stand alone, non-ducted room-type dehumidifiers is difficult if not impossible.

DISCLOSURE OF INVENTION

One object of the present invention is to provide an improved method and means for dehumidifying a gas stream.

Another object of the present invention is an efficient method and means for removing water from an air stream wherein the level of dehumidification is not interdependent with the temperature to which that stream may need to be ultimately cooled (for comfort or other purposes) before it is exhausted into the space being conditioned.

According to one embodiment of the method of the present invention, moisture is removed from a gas stream by bringing that stream into contact with the front surface of a hydrophilic capillary condenser layer that captures the water. An osmotic driving force, resulting from a water concentration gradient, transports the condensed water from the rear surface of the condensing layer through the thickness of an adjacent semi-permeable osmotic layer and into an osmotic fluid.

In apparatus used in the practice of the present invention, a porous wall is used to separate a moist gas stream from an osmotic fluid. The wall is comprised of a thin capillary condensing layer on the gas stream side with an osmotic layer (sometimes referred to as a semi-permeable membrane) disposed on the surface facing the osmotic fluid. In one embodiment the osmotic fluid is a solute dissolved in water, wherein the solute has a high ion (e.g., a salt) concentration; and the osmotic layer is a membrane permeable to water and not to ions in solution, such as a synthetic lipid bilayer. The choice of solute and any other additives making up the osmotic fluid will be determined by the transport properties through the membrane. In some cases, a biocidal component may be added in conjunction with a solute chosen for maximum flux through the membrane. The biocidal component is selected to prevent microbial growth or biofouling on surfaces which would naturally occur in an aqueous environment and eventually block the membrane or pores.

Examples of biocidal or bacteristatic additives that can exist in osmotic fluid as ionic species include silver and copper. In addition to these simple ionic antimicrobial agents, small concentration of larger molecules such as quaternary amines, or gluteraldehydes may be used. Gluteraldehyde is an example of a sterilant and disinfectant that is less corrosive than most other chemicals and does not damage plastics. Bleach (e.g. hypochlorous acid), for example, is antimicrobial but accelerates corrosion and would not be a preferred additive to the osmotic fluid.

Preferably the osmotic layer is in the form of a thin membrane adjacent to the surface of the capillary condenser layer. If the osmotic fluid is a solute dissolved in water, the membrane must have a material composition, thickness, pore size and porosity that must a) prevent the solute within the osmotic fluid from entering or blocking the pores of the membrane, and b) allow water to flow from the capillary condenser layer through the membrane and into the osmotic fluid as a result of a water concentration gradient level maintained during operation of the dehumidifier. In one embodiment the membrane is a lipid membrane layer, such as a synthetic lipid bilayer, disposed over the surface of the capillary layer. In another embodiment the membrane layer is made from collodion.

In another embodiment the osmotic fluid is one that is miscible with water at all concentrations, such as glycerol. Here the fluid can be maintained at a low water concentrations in order to maximize the osmotic flux. Typical membranes have permeabilities for glycerol which are about one thousand times less than for water. However, some reverse transport will likely occur.

The thickness of a typical synthetic lipid bilayer is about 5 nanometers. With layers that thin, water concentration gradients across a single bilayer or even a multilammelar layer can be large. This can provide a large driving force for water transport between the capillary layer and osmotic fluid. Water vapor condensing in the nanopores of the capillary layer will diffuse rapidly through the lipid layer and into the osmotic fluid. The high solute concentration of the osmotic fluid may be maintained in several different ways. For example, excess water may be evaporated or otherwise removed from the fluid; the solute may be replenished at appropriate times or intervals; and/or the fluid may be provided with excess solute (undissolved) that dissolves automatically when the concentration of water in the osmotic fluid exceeds the amount needed to have the water fully saturated by the solute. Other techniques or a combination of techniques may also be used to maintain a high solute concentration.

One of the primary benefits of the present invention is that the humidity of the incoming air may be controlled independently of the temperature. The water may be condensed out of the incoming humid gas stream onto the surface of the pores of the capillary condenser, taking advantage of the rapid and efficient water capture capability of capillary pore condensation technology and without the need to remove sensible heat from the air stream (i.e. the moisture may be removed from the gas stream at ambient temperatures). The water condensed in the capillary layer is caused to move through the osmotic layer and into the osmotic fluid by maintaining a water concentration gradient across the osmotic layer. The water concentration gradient across the osmotic layer is created and maintained by having a sufficiently low concentration of water (i.e. a high concentration of solute or miscible fluid) within the osmotic fluid.

The proper concentration of water in the osmotic fluid may be maintained over time by removing excess water from the osmotic fluid or by adding solute to the osmotic fluid. If it is assumed that the water vapor removed from the air is rejected to an exhaust area not in contact with the treated air, the now dehumidified gas stream may then be cooled to any desired temperature by appropriate means, such as by using a standard air conditioning cycle. The incoming air stream is thus made more comfortable by separately controlling both its humidity and temperature.

The present invention requires less energy to dehumidify a gas stream than do prior art methods. For example, re-evaporation power requirements for the present invention are lower than if the water were to be removed from the system by, for example, reheating a desiccant bed. This is because the osmotic fluid serves as a latent energy buffer for the captured water vapor (i.e. the heat of condensation released when water vapor condenses is buffered by the osmotic fluid). While it may be necessary or desirable, to use an energy source to assist in the removal (e.g. by separation or re-evaporation) of the excess water from the osmotic fluid, the process can be relatively simple and energy efficient compared, for example, to the analogous step of a DS cycle wherein a bed of desiccant is usually taken off line and heated.

The current system has the advantage of minimal moving parts and prolonged dehumidification capability. Even though the accumulated reject water must eventually be removed and energy must be expended, operation of the device may be continued for prolonged periods without such water removal. The reason this is permissible is that the water need not be separated or re-evaporated at the same rate or at the same time at which is it produced. If the water is directed outside, or where a lower humidity waste stream is present, or preferably where a source of waste heat is present (such as the condenser or compressor of an air conditioning system), the water may gradually evaporate with no additional work to be done by the system.

Capillary condensers that may be used in the present invention are well known in the art. The pore size and porosity of the capillary condenser layer are selected to assure that the water condenses onto the pore surfaces at a rate much faster than the rate at which it evaporates from the pores. The net amount of condensed water moves, by capillary action throughout the volume of the condenser to the interface of the condenser and the osmotic layer by capillary action and due to the hydrophilic nature of the condenser material. A thin capillary condenser layer may be supported on the surface of a thicker, larger pore condenser layer for structural integrity. Mounting the osmotic membrane on the back surface of the support can provide an effective spacer to keep capillary pressure from countering the osmotic forces. A micron thickness macroporous support between the capillary condenser and the membrane will accomplish this without reducing water flux significantly.

As mentioned above, an osmotic fluid that may be used in the method of the present invention is comprised of a solute dissolved in water. For example, the solute may be a salt. The solute and the osmotic layer are selected such that the size of the hydrated solute molecules are greater than the pore size of the osmotic layer in order to prevent the solute from flowing through the osmotic layer toward the capillary layer. The solute is selected such that molecules of solute do not cause blocking of the pores of the osmotic layer, which they would if they became lodged, to a significant extent, within the pores of the osmotic layer. To assure that the condensed water flows from the capillary condenser layer through the osmotic layer and into the osmotic fluid, a high concentration of solute is maintained in the osmotic fluid to maintain a high water concentration gradient across the osmotic layer.

In accordance with one embodiment of the dehumidification apparatus of the present invention, the combined condensing layer and osmotic layer define a porous wall within an enclosure. The wall, in combination with the enclosure, forms separate compartments on opposite sides of the wall. The compartment on the condenser layer side of the wall is the airflow compartment and the compartment on the osmotic layer side of the wall is the osmotic fluid compartment. High humidity air, which may be outside air and/or recirculated indoor air, is brought into and through the airflow compartment and passes over the condenser surface. Water vapor in the air condenses and travels to the interface between the condensing layer and osmotic layer through the capillary pores. The less humid air exits the airflow compartment and may then be cooled by separate air conditioning apparatus, if desired.

A solution of water and solute (osmotic fluid) is disposed within the osmotic fluid compartment. As a result of the water concentration gradient across the osmotic layer, the water within the capillary condenser layer travels from the interface between the condenser and osmotic layers, through the osmotic layer, and into the osmotic fluid. This results from an osmotic driving force created by the water concentration gradient across the osmotic layer. The dehumidification apparatus preferably includes means for regenerating the osmotic fluid to maintain a high concentration of solute in the osmotic fluid, and thus to maintain the high water concentration gradient across the osmotic layer during operation of the apparatus. For example, apparatus may be provided to evaporate, either continuously or as needed, excess water from the osmotic fluid.

The porous wall could also be the wall of a tube, with the above referred to compartments being the space within the tube (e.g. the osmotic fluid compartment) and the space surrounding the tube (e.g. the air flow compartment). The osmotic layer would be disposed on the capillary condenser surface on the inside of the tube.

BEST MODE FOR CARRYING OUT THE INVENTION

Figure 1:
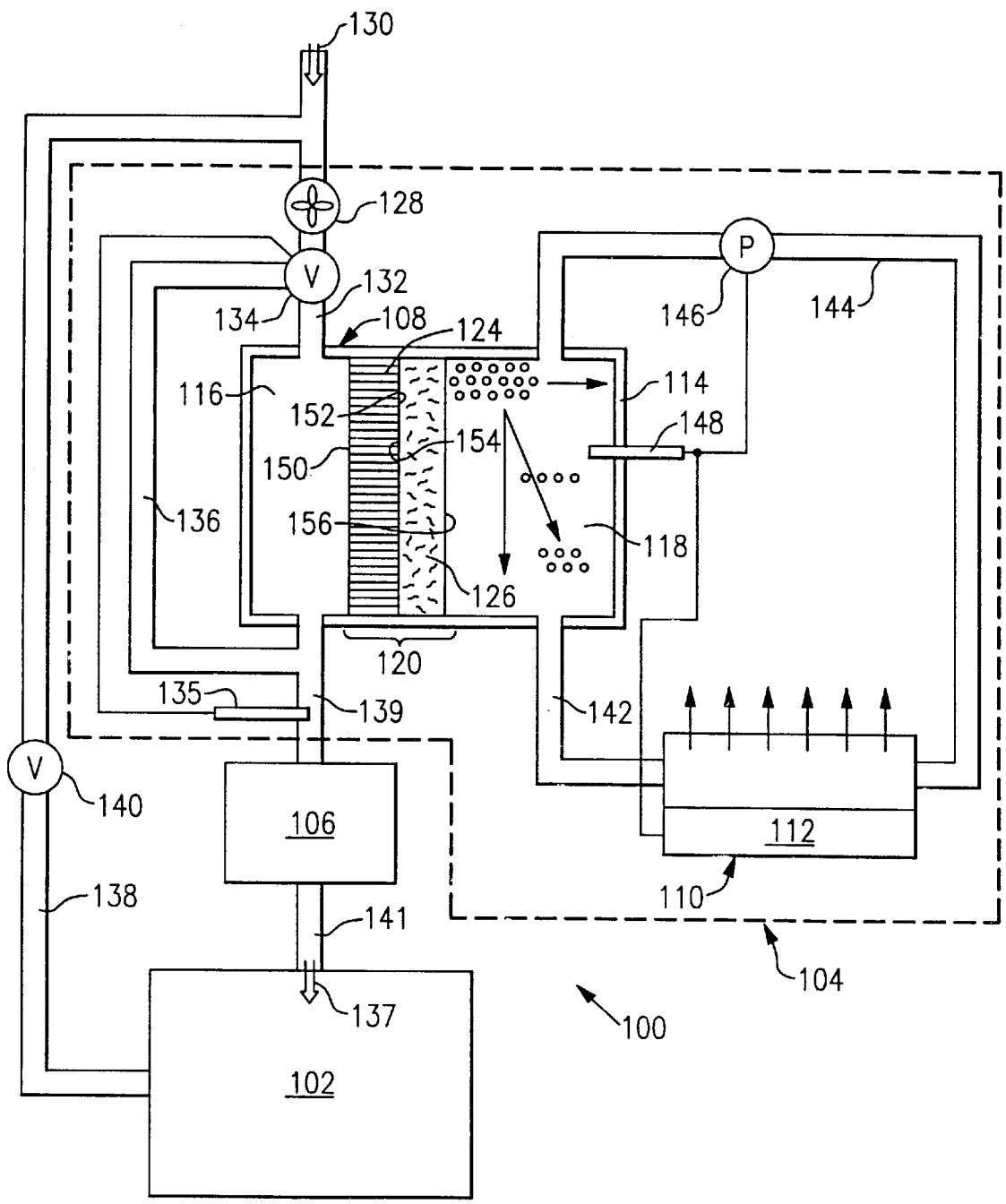
FIG. 1 is a schematic view of an air conditioning system incorporating the features of the present invention.

The sole Figure schematically depicts an air conditioning system 100 for conditioning the air within an enclosed space 102. The system 100 includes dehumidification apparatus 104 (represented by the components within the dotted line) and cooling apparatus 106. The dehumidification apparatus includes a dehumidifier 108 and an evaporator 110. In this embodiment the evaporator includes an auxiliary heater 112. The dehumidifier 108 is schematically depicted as an enclosure 114 divided into an airflow compartment 116 and an osmotic fluid compartment 118. The compartment 118 contains an osmotic fluid, which is water with a solute dissolved therein. The compartments 116, 118 are separated by a porous wall 120 comprising a capillary condensing layer 124 and an osmotic layer 126.

Before providing a more detailed description of the properties and characteristics of the porous wall and osmotic fluid, and the interrelationships between them, it is helpful to first have a general understanding of the overall operation of the air conditioning system within which they are incorporated.

The system 100 operates as follows: A fan 128 or other suitable means pulls humid outside air, represented by the arrow 130, into an inlet duct 132 and blows it into and through the airflow compartment 116. A valve 134 within the duct 132 may direct all, some or none of that air around the dehumidifier through a bypass duct 136, depending upon dehumidification requirements. In this schematic representation, the valve 134 is controlled based upon a signal from a sensor 135 which measures the humidity of the air stream as it leaves the dehumidifier 108.

As the air passes through the compartment 116, water in the air condenses within the pores of the capillary condenser layer 124 and travels through the osmotic layer 126 into the osmotic fluid within the compartment 118. The dehumidified air leaves the air flow compartment 116 through a duct 139 and is directed into the cooling apparatus 106, which may be of any desired type. The cooling apparatus 106 cools the air, if necessary or desired, and exhausts it via a duct 141 into the enclosed space 102 being conditioned, as depicted by the arrow 137. Part of that cooled and dehumidified air may be recirculated through the dehumidifier and cooling apparatus, such as by returning a portion of it, via a duct 138, to the inlet duct 132, to be mixed with incoming outside air 130. A valve 140, or the like, controls the amount of air recirculated, and may be responsive to any number of parameters, such as the humidity and/or temperature of either or both the outside air 130 and air within the space 102. Although not shown in the Drawing, the conditioned air within the space 102 may also be recirculated through only the cooling apparatus if dehumidification is not needed.

Further regarding operation of the system 100, the osmotic solution leaves the compartment 118 via a duct 142, passes through the evaporator 110, and is returned to the compartment 118 via a duct 144. In the evaporator, water within the osmotic fluid evaporates into the atmosphere at a rate selected to maintain a desired water concentration within the osmotic fluid in the compartment 118. As shown in the FIGURE, the auxiliary heater 112 and a pump 146 within the duct 142 are used to affect the rate of evaporation. Their operation is controlled by a signal from a sensor 148 that monitors the water concentration of the osmotic fluid within the compartment. The auxiliary heat needed to vaporize water in the evaporator 110 may be the waste heat from the cooling apparatus 106, although this heat transfer is not shown in the Figure.

An alternate method for maintaining the proper water concentration in the osmotic fluid is to direct the osmotic fluid from the compartment 118 into a large surface area overflow pan exposed to the outside air. Fresh osmotic fluid with an appropriate water concentration would be pumped into the compartment, as needed.

The porous wall 120 of the dehumidifier 108 comprises the condenser layer 124 and the osmotic layer 126. The condenser layer is hydrophilic. The osmotic layer is either hydrophobic or hydrophilic. If hydrophilic, the surface 156 of the osmotic layer would need to be treated to make it hydrophobic to inhibit the back-flow of water through the layer.

The condenser layer 124 has a front surface 150 exposed to the air in the compartment 116, and a rear surface 152 in continuous surface contact with a front surface 154 of the osmotic layer 126, defining an interface. The osmotic layer 126 may be a lipid layer adhered to the rear surface 152 of the condenser layer. The rear surface 156 of the osmotic layer 126 faces the osmotic fluid compartment 118 and is in contact with the osmotic fluid. Materials other than lipids and having the properties described hereinafter may also be used as the osmotic layer, such as collodion.

A lipid layer is a semi-permeable membrane that emulates the function of biological membranes in that it is very thin, consists of aligned molecules extending across the thickness of the layer. In the present invention it serves as the physical boundary layer between the capillary condenser 124 and the osmotic fluid in the compartment 118. At the molecular level, the lipid layer is formed of one or more bilayers, each consisting of two layers of molecules. The thinner the lipid layer, the greater the water flux from the capillaries of the condenser layer 124, through the lipid layer, into the osmotic fluid, since flux across the osmotic layer is inversely proportional to the osmotic layer thickness.

The lipid layer may be "painted" onto the rear surface 152 of the capillary condenser layer, or may be applied by dipping the surface 152 of the capillary condenser layer 124 into a lipid solution and evaporating the solvent. The lipid layer adheres to the capillary layer by van der Waal adhesion.

In addition to attaching a lipid layer to the capillary condenser surface using van der Waal adhesion forces, a lipid layer may also be attached through covalent bonding, such as by co-precipitating another polymer with the lipid, and then attaching the co-polymer to the condenser surface. One way to accomplish this is by immobilizing the polar end group of the lipid onto a hydrophilic end group on a polymeric substrate (such as carboxylic or hydroxyl groups) through radical polymerizations. It is known that the permeability of solutes and the mechanical strength of membranes do not change after such surface modification. Condenser surface modification may also be employed, such as chemical modification using radioactive isotopes (e.g., cobalt-60), microwaves, radiofrequencies, plasma discharges, photoactivation, and redox reagents. Other lipid layer attachment methods include graft polymerization, physical adsorption, and interpenetrated network formation.

The osmotic layer of the present invention is preferably made from synthetic materials, including, but not limited to synthetic polymers. Synthetic polymers are typically derived from petrochemicals. Examples of synthetic polymers include polycarbonate, polyacrylonitrile, polyethylene vinyl alcohol, polypropylene, polyamide, polysulfone, and polymethylmethacrylate. These are hydrocarbon chain polymers which contain only carbon atoms in the backbone of the polymer. Their surfaces tend to be hydrophobic with microdomains that are hydrophilic. They are typically highly permeable to water and lower molecular weight solutes. One of the reasons synthetics can be used is that surface modification (e.g. through co-polymerization) can be rather easily accomplished to covalently bond the osmotic layer to the surface.

According to one embodiment of the present invention, it is proposed that a capillary layer surface be coated with a phospholipid. Phospholipids generally do not adhere well and tend to be mobile because they are not bound to each other and can move around on the capillary layer surface. A solution to this problem is to incorporate the phospholipid into a polymer. The capillary layer surface would be coated with the phospholipid-containing polymer. The polymer provides stability, mechanical strength, and a method of adhering the phospholipid in a fixed orientation. Phosphatidylcholine may be used as the phospholipid and polystyrene may be used as the polymer. One example of such a polymer is 2-methacryloyloxyethyl phosphorylcholine (MPC) polymer containing phospholipid polar groups. The phospholipids will be tightly packed, thereby having the well-known property of preventing protein adsorption and microbial fouling of the of the lipid layer.

The thickness of the osmotic layer, such as a lipid layer, may be within the range of 5 to 200 nanometers. Thinner layers are preferred in order to have a higher water flux. Due to the large Gibbs Free Energy drive across the osmotic layer exerted by the osmotic fluid, the pore morphology of the lipid layer allows water transfer from the capillary condenser, through the lipid layer, and into the osmotic compartment or reservoir. That is because the water in the capillary pores of the condenser layer is water in the pure liquid state, and the osmotic fluid is chosen to have a high concentration of solute. The osmotic fluid exerts a type of osmotic "pressure" on the condensed pure water. The magnitude of the osmotic pressure is described by the Van't Hoff equation, while the osmotic pressure gradient is in direct proportion to this magnitude and indirectly proportional to the thickness of the osmotic layer.

The preferred pore size for the osmotic layer will depend upon the nature of the solute used in the osmotic fluid. As mentioned above, the pores should not be so large that the hydrated solute molecules can pass through them or enter and block them. Pore diameters on the order of 10 to 20 Angstrom would be acceptable for use with most osmotic fluids. If a salt solution is used as the osmotic fluid, pore diameters of between 5 to 10 Angstrom are preferred. The water flux across the lipid layer is a function of the layer's permeability and the water concentration difference across the osmotic layer. (Flux equals the product of permeability, cross sectional area, and concentration difference across the layer. The permeability is inversely proportional to the membrane thickness. Thus, the osmotic layer thickness and osmotic layer permeability may be selected to provide the desired flux for a given water concentration difference across the osmotic layer. The permeability of water through a synthetic lipid layer has been measured to be about $5 \times 10^{-3}$ cm/sec. The water concentration difference across a lipid layer for a 5M salt solution is $5 \times 10^{-3}$ moles/cm$^3$. Thus, with a total cross sectional area of 10,000 cm$^2$, the dehumidification rate would be about 16 liters/hr.

The osmotic fluid must be selected such that the solute does not permeate the osmotic layer, has high solubility in water, and does not degrade the osmotic layer. Osmotic fluids may be either ionic solutions or nonionic solutions. Nonaqueous solutions may also be used. If the osmotic layer is a lipid layer, the osmotic fluid is preferably a solution having a high ion concentration (low water concentration). Examples of osmotic fluids are sodium salt solutions and phosphate salt solutions, although other salts may be used. Examples of osmotic fluids made with nonionic solvents which may be used in the method of the present invention are gluteraldehyde, dextran, amines, proteins, and sucrose. Examples of two non-aqueous osmotic fluid solutions are glycerol and potassium formate.

In the foregoing description methods are described for maintaining a high water concentration gradient across the osmotic layer that involve either evaporating excess water or to adding fresh osmotic fluid to the osmotic compartment 118. In a further embodiment the osmotic fluid intentionally includes solute in excess of the saturation limit. Thus, initially, solute crystals will be present in the osmotic fluid. As water passes from the capillary pores through the osmotic layer and into the osmotic fluid, more solute will dissolve, due to the presence of the additional water; and thus the concentration of solute in solution will remain at the highest level, i.e., saturation. Eventually, when all the undissolved solute crystals dissolve and even more water enters the osmotic fluid, the concentration of solute will gradually decrease and the osmotic driving force will decrease, thereby reducing the amount of water transported through the osmotic layer. At this point, the water must be removed and the solution reconcentrated.

EXAMPLE

Using a Collodion Membrane as the Osmotic Layer

Figure 2:
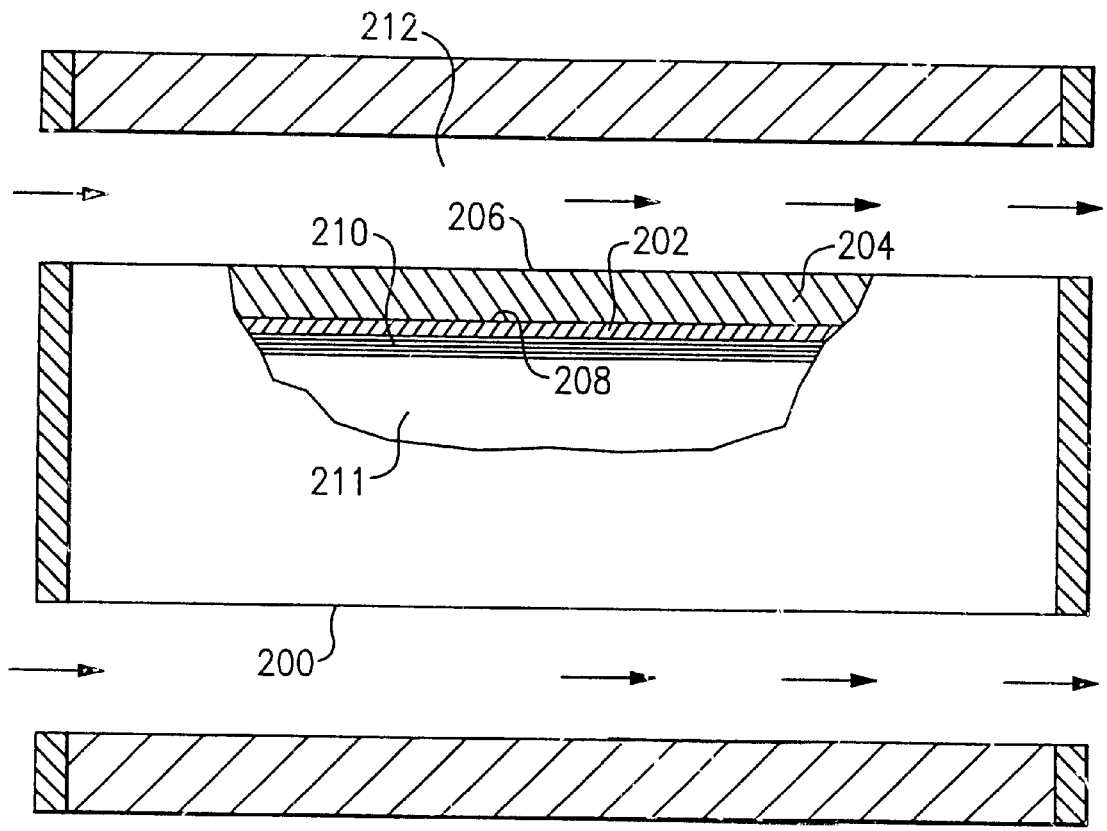
FIG. 2 is a schematic, cross-sectional view of a porous tube constructed in accordance with the teachings of the present invention.

An osmotic layer or membrane was prepared by coating a thin layer of collodion (cellulose nitrate base polymer) onto the inner surface of a commercial alumina cylindrical tube having an asymmetric pore distribution. This tube is the condenser layer of the present invention and is represented by the reference numeral 200 in FIG. 2. The porous wall of the tube had an inner alpha-alumina capillary pore layer 202, 20 nanometers thick, and an outer gamma-alumina larger pore support layer 204 of gamma alumina $3 \times 10^6$ nanometers thick. The capillary pore layer had a pore size of 40 Angstrom, and the support layer had a porosity decreasing from about 1.0 micron at the tube outer surface 206 to about $2 \times 10^{-3}$ microns at the interface 208 with the capillary layer 202. The thin collodion layer is designated by the reference numeral 210. Prior to coating, the tube had an inner diameter of 0.7 cm, an outer diameter of 1.0 cm, and a length of 5.0 cm. The coating was accomplished by filling the center of the tube 211 with a 10%, by volume, collodion solution in alcohol for around 30 seconds. The diluted collodion solution in the tube was subsequently removed and the tube dried at room temperature overnight.

Because the hydroxyl groups on the surface of collodion layer provide undesired surface hydrophilicity, the hydroxyl groups were removed by reacting them with hexamethyldisilazane $(HN(Si(CH_3)_3)_2)$. This surface modification process is analogous to the collodion coating procedure, except pure hexamethyldisilazane was used as the coating solution. The modified collodion surface was hydrophobic.

In a test of the invention, the internal volume 201 of the alumina tube 200 was completely filled with an osmotic fluid of pure glycerol. (The internal volume 211 of the tube is analogous to the osmotic fluid compartment 118 of FIG. 1.) Air with a 60% relative humidity, 25° C. temperature, and flow rate of 133 standard cubic centimeters per minute was flowed axially over the large pore external surface 206 of the tube through an annular compartment 212 surrounding the tube. (The compartment 212 is analogous to the air flow compartment 116 of FIG. 1.) The relative humidity of air stream leaving the annular compartment 212 was measured to be 52%. The flux of water vapor across the collodion layer 210 was calculated as 20.85 liter/m$^2$/hr.

From this experiment it was apparent that the water vapor diffused into the large pores of the support tube and condensed inside the small pores adjacent the collodion layer. The thin collodion layer assisted in maintaining a high water concentration gradient between the surface of the capillary pore layer and the glycerol adjacent the collodion layer, thereby resulting in water being driven from the capillary pores, through the collodion layer, and into the glycerol osmotic fluid.

It is believed that the experimental device operated as follows: The water vapor within the incoming air diffused into the large pores and condensed inside the small pores of the capillary condenser layer adjacent to the collodion layer. The thin collodion layer created a high water concentration gradient across its thickness that assisted in driving the water from the capillary condenser pores and through the thickness of the collodion layer. On the external surface of the collodion membrane, pure glycerol passed through the small-pore surface of the collodion membrane and helped drive water out of the pores of the collodion membrane and into the glycerol.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A process for dehumidifying a gas stream comprising the steps of bringing the humid gas stream into contact with the front surface of a first layer of hydrophilic material, the material having through pores to a rear surface of the first layer; condensing water from the gas stream onto the surfaces of the pores within the first layer and transporting condensed water to the rear surface through capillary action; maintaining a water concentration gradient across a porous osmotic layer disposed on the rear surface of the first layer, wherein the step of maintaining a water concentration gradient includes having an osmotic fluid in continuous contact with the outwardly facing surface of the osmotic layer, and maintaining a sufficiently high water concentration gradient across the osmotic layer during the dehumidification process to result in a continuous flux of water, by osmosis, from the first layer through the osmotic layer into the osmotic fluid during the dehumidification process.

2. The process of claim 1, wherein the osmotic layer is hydrophobic.

3. The process of claim 2, wherein the osmotic layer is a synthetic lipid.

4. The process of claim 1, wherein the osmotic fluid comprises a solute dissolved in water.

5. The process of claim 2, wherein the solute is an ionic solute, and the osmotic layer is a synthetic lipid layer, and the said step of maintaining a sufficiently high water concentration gradient across the osmotic layer includes maintaining a sufficiently high concentration of solute within the osmotic fluid.

6. The process of claim 4, wherein the step of maintaining a sufficiently high water concentration gradient across the osmotic layer includes adding solute to the osmotic fluid when the water concentration gradient becomes too low.

7. The process of claim 4, wherein the solute is an ionic solute.

8. The process of claim 4, wherein the solute includes an ionic salt.

9. The process of claim 4, wherein the solute includes sodium chloride or potassium chloride.

10. The process of claim 8, wherein the hydrophobic layer is a lipid layer.

11. The process of claim 4, wherein the step of maintaining a sufficiently high water concentration gradient across the osmotic layer includes removing water from the osmotic fluid when the water concentration gradient becomes too low.

12. Apparatus for the dehumidification of an air stream including A) a first compartment adapted to receive a flow of humid air therethrough, B) an osmotic fluid compartment having an osmotic fluid therein, and C) a porous wall separating said compartments, wherein said porous wall includes pores therewithin, said wall comprising a) a porous condenser layer having a first surface facing said first compartment and a second surface facing said osmotic fluid compartment, the pores at said second surface being capillary pores, and b) a porous osmotic layer disposed on said second surface forming an interface at said second surface, said osmotic layer being adjacent said osmotic fluid compartment and adapted to i) separate said condenser layer from said osmotic fluid in said osmotic fluid compartment during dehumidification, and ii) allow water to flow from said interface into said osmotic fluid in said osmotic fluid compartment during dehumidification.

13. The apparatus according to claim 12, wherein the osmotic fluid includes a solute dissolved in water, and the thickness and pore size of said osmotic layer is selected to prevent molecules of solute from blocking said pores of said osmotic layer or from flowing through said osmotic layer to said condenser layer.

14. The apparatus according to claim 9, wherein the osmotic fluid includes a biocidal component of a type sufficient to prevent blocking of said pores of said collodion layer by microbial growth.

15. The apparatus according to claim 9, wherein the osmotic fluid includes a biocidal component selected from the group of (a) silver, (b) copper, (c) detergent, (d) guartermay amines, (e) gluteraldehydes, and (f) bleach.

16. The apparatus according to claim 12, wherein said osmotic fluid is glycerol or potassium formate.

17. The apparatus according to claim 13, wherein said osmotic fluid is a salt solution.

18. The apparatus according to claim 12, wherein said osmotic layer is a lipid layer.

19. The apparatus according to claim 12, wherein said osmotic layer is a co-polymer including a lipid.

20. The apparatus according to claim 13, wherein said osmotic layer includes a lipid layer, and said solute is an ionic solute.

21. Apparatus for the dehumidification of an air stream including a first compartment adapted to receive a flow of humid air therethrough, an osmotic fluid compartment, a porous wall separating said compartments, a water based osmotic solution disposed within said osmotic compartment, said solution including a solute, and means to maintain a water concentration gradient across said wall;

wherein said wall comprises a) a porous hydrophilic condenser layer facing said first compartment and having open pores extending through the thickness thereof and b) a porous hydrophobic osmotic layer facing said osmotic fluid compartment and in continuous surface contact with said condenser layer to define an interface therebetween and having open pores extending therethrough, and adapted to carry water from said interface to said osmotic fluid;

wherein said condenser layer has a pore size adapted to result in i) water from the humid air condensing, within said condenser layer pores, and ii) movement of the condensed water within said pores to said interface by capillary action;

wherein said osmotic layer has a pore size and other physical properties adapted x) to prevent osmotic fluid solute molecules from blocking the pores of said osmotic layer during dehumidification, and, y) to prevent the flow of said osmotic fluid solute from the osmotic fluid compartment through the pores of said osmotic layer; and wherein said means for maintaining a predetermined minimum water concentration gradient across said osmotic layer comprises means for maintaining a sufficiently high concentration of said solute in said osmotic fluid, wherein said predetermined water concentration gradient is selected to assure that, during dehumidification, a continuous flux of water moves from said interface by osmosis through said osmotic layer into said osmotic fluid.

22. The apparatus of claim 21, wherein said means for maintaining a sufficiently high concentration of solute within said osmotic fluid in said osmotic compartment includes a) means for circulating said osmotic fluid into and out of said osmotic compartment, and b) means for evaporating water therefrom while said osmotic fluid is outside said osmotic compartment.

23. The apparatus of claim 21, wherein said means for maintaining a sufficiently high concentration of said solute within said osmotic fluid includes means for evaporating excess water from said osmotic fluid.

24. The apparatus of claim 21, wherein said means for maintaining the concentration gradient of water above a minimum level includes means for adding a solute to said osmotic fluid.

25. The apparatus of claim 21, wherein said osmotic layer is a lipid layer.

26. The apparatus of claim 21, wherein said solute is a salt.

27. The apparatus of claim 21, wherein the pore size of said osmotic layer is less than 20 Angstroms and the thickness of the osmotic layer is between 5 and 200 nanometers.

* * * * *